US007885643B2

(12) United States Patent
Shimomura

(10) Patent No.: US 7,885,643 B2
(45) Date of Patent: Feb. 8, 2011

(54) INFORMATION COMMUNICATION SYSTEM

(75) Inventor: Toshio Shimomura, Chiryu (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 764 days.

(21) Appl. No.: 11/808,542

(22) Filed: Jun. 11, 2007

(65) Prior Publication Data

US 2008/0014909 A1 Jan. 17, 2008

(30) Foreign Application Priority Data

Jul. 11, 2006 (JP) ............................ 2006-190875

(51) Int. Cl.
*H04M 3/42* (2006.01)

(52) U.S. Cl. .................................... 455/414.1; 455/403

(58) Field of Classification Search ................. 455/410, 455/420, 517; 713/151, 152, 161, 164, 165
See application file for complete search history.

(56) References Cited

U.S. PATENT DOCUMENTS

| | | | |
|---|---|---|---|
| 6,532,415 B2 | 3/2003 | Nishikawa | |
| 7,236,945 B2 | 6/2007 | Oshima | |
| 2004/0185842 A1* | 9/2004 | Spaur et al. | 455/420 |
| 2005/0003844 A1* | 1/2005 | Nishiga et al. | 455/517 |
| 2005/0256762 A1* | 11/2005 | Dar et al. | 705/13 |
| 2008/0046173 A1* | 2/2008 | Lappe et al. | 701/209 |
| 2009/0224892 A1* | 9/2009 | Nicholls | 340/10.42 |

FOREIGN PATENT DOCUMENTS

| | | |
|---|---|---|
| JP | 2003-323692 | 11/2003 |
| JP | 2004-085405 | 3/2004 |
| JP | 2004-164433 | 6/2004 |
| JP | 2004-280696 | 10/2004 |

OTHER PUBLICATIONS

Japanese Office Acton dated Nov. 2, 2010, issued in counterpart Japanese Application No. 2006-190875, with English translation.

* cited by examiner

*Primary Examiner*—Dwayne D Bost
*Assistant Examiner*—Myron Wyche
(74) *Attorney, Agent, or Firm*—Nixon & Vanderhye PC

(57) ABSTRACT

A system of plural vehicles is organized by transmitting information through communication devices being capable of establishing direct intercommunication respectively installed in the plural vehicles. The transmission of the information is controlled by a control unit in the system as well as a memory for storing a vehicle ID, an information generation unit for generating offer information including the vehicle ID, a display unit for displaying information, an output unit for outputting information, and a vehicle-to-vehicle communication unit for establishing communication. The control unit provides a user in the vehicle that has transmitted the offer information with an information fee or an information point by performing an information fee/point payment process.

17 Claims, 5 Drawing Sheets

INFORMATION COMMUNICATION SYSTEM

CROSS REFERENCE TO RELATED APPLICATION

This application is based on and claims the benefit of priority of Japanese Patent Application No. 2006-190875 filed on Jul. 11, 2006, the disclosure of which is incorporated herein by reference.

FIELD OF THE INVENTION

The present invention generally relates to an information communication system that exchanges information through a vehicle to vehicle communication.

BACKGROUND INFORMATION

Conventionally, an information communication system as disclosed, for example, in Japanese patent document JP-A-2004-280696 utilizes a vehicle-to-vehicle communication for exchanging information. The communication system in the disclosure includes plural vehicles that are equipped with an abnormal condition detector and communication devices or the like for use in the vehicle-to-vehicle communication that enables a direct communication between vehicles. The communication system notifies an abnormal condition of a vehicle to surrounding vehicles through the vehicle-to-vehicle communication when the abnormal condition is detected by the abnormal condition detector.

However, the communication system described above merely notifies the abnormal condition of the vehicle to the surrounding vehicle through the vehicle-to-vehicle communication.

On the other hand, the information communication system with the vehicle-to-vehicle communication may be utilized for providing information that is profitable for users in the surrounding vehicles. Because the provision of the information is, in this case, on a spontaneity basis, the amount of the information deposited for provision to the "neighborhood" may decrease or may possibly be reduced to naught. When the available information in the information communication system decreases, the information may become hard to be acquired, or may become impossible to be acquired by the user in the surrounding vehicles.

SUMMARY OF THE DISCLOSURE

In view of the above and other problems, the present disclosure provides an information communication system that enables an easier acquisition of information by a user in a vehicle.

The information communication system including plural vehicles that are equipped with a communication device for establishing a direct communication among the plural vehicles includes in each of the plural vehicles, an ID code storage that stores an ID code for uniquely identifying one of the plural vehicles, an information generation unit that generates offer information to be offered for a rest of the plural vehicles with the ID code, an output unit that outputs the offer information received by the communication device in a form of at least one of a voice and an image, and a control unit that controls a transmission of the offer information generated by the information generation unit and controls an output of the offer information received by the communication device. The control unit performs a payment process that pays a user of the vehicle from which the offer information has been transmitted for one of an information fee of the received offer information and an information point that corresponds to the information fee.

In this manner, the offer information from one of the plural vehicles is rewarded by the information fee or the information point, thereby facilitating the provision of the offer information and increasing the availability of the offer information.

In another aspect of the present disclosure, the information communication system having plural vehicles that are equipped with a communication device for establishing a direct communication among the plural vehicles includes in each of the plural vehicles an ID code storage that stores an ID code for uniquely identifying one of the plural vehicles, an information storage unit that stores offer information including advertisement information of a facility to be offered for a rest of the plural vehicles, an output unit that outputs the offer information received by the communication device in a form of at least one of a voice and an image, and a control unit that controls an output of the offer information to the output unit and a transmission of the offer information through the communication device upon receiving the offer information by the communication device. The control unit performs for the facility a billing process of one of an advertising fee and an advertising point that corresponds to the advertising fee.

In this manner, the offer information from one of the plural vehicles is rewarded by the advertisement fee or the advertisement point, thereby facilitating the provision of the offer information and increasing the availability of the offer information.

Further, a transmission side of the offer information including the advertisement information of the facility performs a billing process for the facility according to a transmission condition of the offer information. Therefore, a reception side of the offer information is not charged for the advertisement information even after receiving the advertisement information.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present disclosure are described with reference to the accompanying drawings.

An embodiment of the present disclosure is described as an example that utilizes offer information from an information communication system with parking information included therein.

Figure 1:
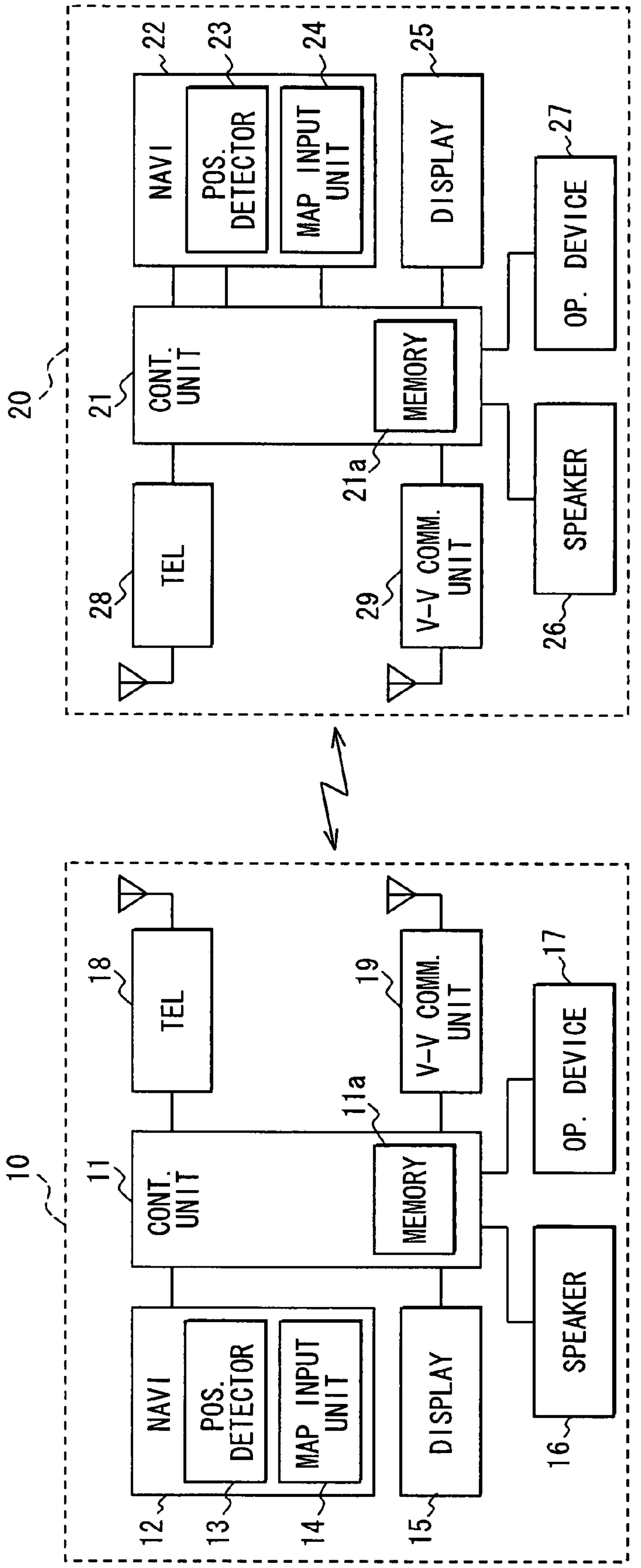
FIG. 1 shows a block diagram of an information communication system in an embodiment of the present disclosure.

FIG. 1 shows a block diagram of the information communication system in the embodiment of the present disclosure. The embodiment of the present disclosure is not limited to the following description, and may have variations as long as it is within a technical scope of the present invention.

The information communication system includes a vehicle 10 and a vehicle 20, respectively equipped with a vehicle-to-vehicle communication unit 19 (V-to-V communication unit 19 hereinafter) and the like. The information communication system of the present disclosure offers and acquires various kinds of offer information by using vehicle-to-vehicle communication.

The configuration of the vehicle 10 and vehicle 20 is described in the first place. The vehicle 10 and the vehicle 20 have the same configuration, and plural vehicles that participate in the present system also have the same configuration.

In each of the vehicles 10 and 20, control units 11, 21, memories (i.e., ID code storage unit) 11*a*, 21*a*, navigation apparatus 12, 22, position detectors 13, 23, map data input units 14, 24, display units 15, 25, speakers 16, 26, operation devices 17, 27, telephone units 18, 28, and V-to-V communication units 19, 29 are installed. Because the vehicles 10 and 20 are configured in the same manner, only the vehicle 10 is described in the following.

The control unit 11 is mainly constructed with a microcomputer with a CPU, a ROM, a RAM, a memory 11*a* and the like included therein. The memory 11*a* is a storage medium such as an EEPROM or the like, and stores an ID code to specify a user account (an account of communication expense) for its respective vehicle 10. The CPU retrieves a program recorded by ROM for execution and exchanges with, as described later, the navigation apparatus 12, the display unit 15, the speaker 16, the operation device 17, telephone unit 18, the V-to-V communication unit 19 and the like various signals (image signals, sound signals and the like) for operation. Further, the control unit 11 generates offer information including the ID code based on instructions from the user. In addition, the offer information in the present embodiment includes information on the respective vehicle 10 (the vehicle which transmitted the offer information) coming out of a parking space and park space information about a position of the parking space.

The navigation apparatus 12 includes the position detector 13, the map data input device 14 and the like. The navigation apparatus 12 is mainly constructed by a microcomputer, and includes a ROM, a RAM, a memory such as an EEPROM, an interface circuit and a bus line for data transmission. In addition, the navigation apparatus 12 performs a guidance course setting and the like by using a program memorized in the ROM, the RAM, the EEPROM and the like.

The position detector 13 includes various sensors such as a GPS (the Global Positioning System) receiver, a gyroscope, a distance sensor, a geomagnetism sensor as a device to detect a position coordinate (designated as a current position hereinafter) of the respective vehicle 10. In this case, the detected current position is inputted into the control unit 11.

The map data input unit 14 is a storage medium to memorize a map database of map data including graphic type data such as road data, landmark data, facility data (i.e., polygon data), background data and the like for map display, route navigation and the like, as well as index type data as facility name, phone numbers and the like for destination search, nearby facility search and the like. The storage medium is, in terms of data storage capacity and data handling, constructed by using rewritable hard disk drive (HDD) or the like.

The display unit 15 includes display screens such as a color liquid crystal panel or the like. The display unit 15 displays road map around the vehicle generated from the map data stored in the map data input unit 14 based on the image signal from the control unit 11 as well as parking space information that is included in the offer information to be explained later. The speaker 16 outputs a guidance voice for route guidance, the parking space information based on the voice signal from the control unit 11.

The operation device 17 includes a touch switch on the display unit 15, a hardware switch of a push type disposed around a screen of the display unit 15, and a joystick that controls a cursor displayed on the screen of the display unit 15. Further, the operation device 17 is used to input to the control unit 11, various types of information such as destination information including position information of a destination, an operation signal that corresponds to functions of the navigation apparatus 12 such as route navigation setting that sets a navigation route from the current position to the destination, and a request signal that indicates a request of the offer information under a control of user operation.

The telephone unit 18 is a vehicular data communication module (DCM) that performs radio communication (data communication, sound communication) through a telephone network (a communication nucleus facility) including base stations and the like, a handset and the like. The V-to-V communication unit 19 is a Bluetooth modem that establishes a free radio frequency band communication (data communication) of a short distance radio method to be used in limited areas, an infrared communication device or the like for direct communication between vehicles without using the telephone network.

Figure 2:
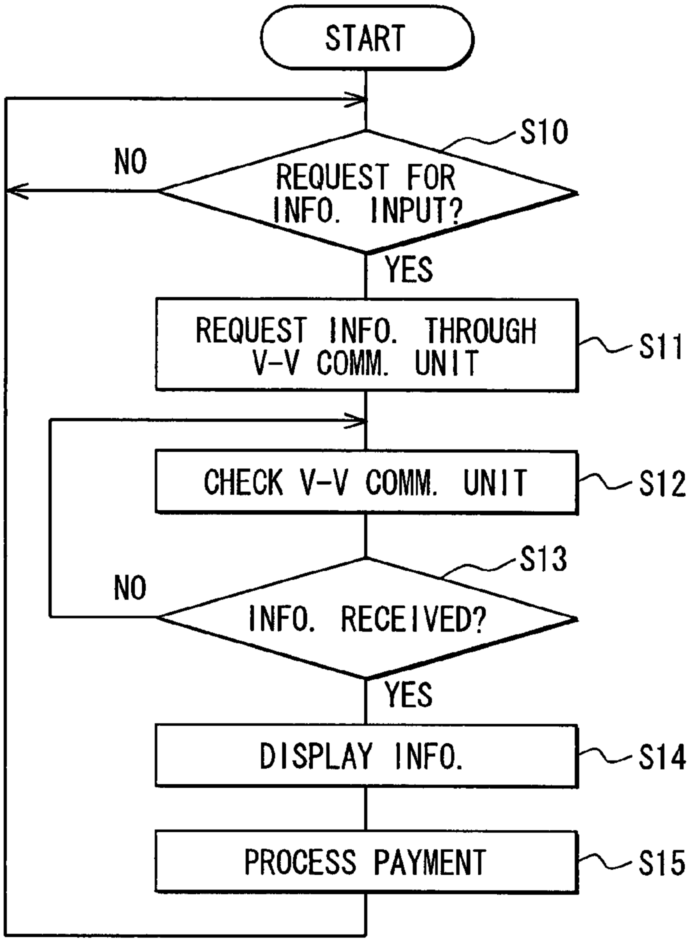
FIG. 2 shows a flowchart of a process on an information acquisition side in the embodiment of the present disclosure.
Figure 3:
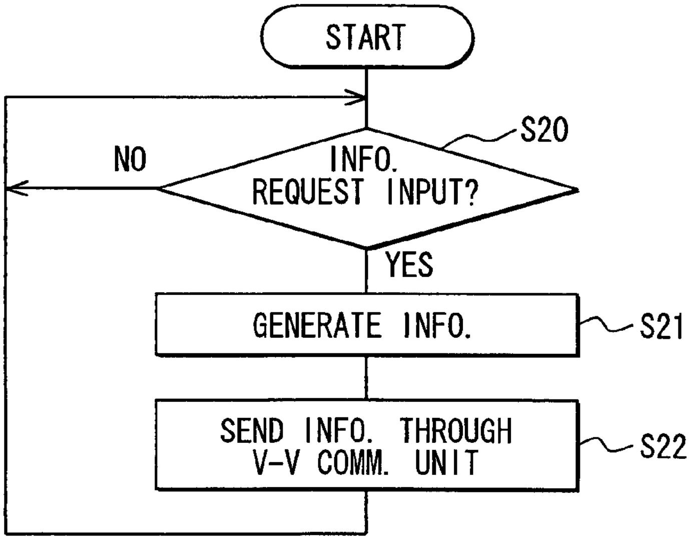
FIG. 3 shows a flowchart of a process on an information transmission side in the embodiment of the present disclosure.

An operation of the information communication system in the present embodiment is described in the following. FIG. 2 shows a flowchart of a processing operation of the control unit 11 on an information acquisition side that requests and receives information. FIG. 3 shows a flowchart of a processing operation of the control unit 17 on the information transmission side that receives the request of the information and transmits the information in response to the request. In this case, the processing operation of the flowcharts in FIGS. 2 and 3 are executed while an electric power is supplied to the control units 11, 21. In addition, in the present embodiment, the vehicle 10 receives the request for the offer information while departing from a parking space, and the vehicle 20 sends the request of the offer information while trying to park in a parking space.

First, as shown in FIG. 2, the control unit 21 of the vehicle 20 determines whether to request for the offer information in step S10. When an input of an operation signal that indicates a request of the offer information is detected (S10:YES), the processing operation determines that the offer information is requested, and advances to step S11. When the input of the operation signal of the request is not detected (S10:NO), the processing operation determines that the offer information is not requested, and repeats of step S10.

Then, in step S11, the control unit 21 of the vehicle 20 sends a signal of the request of the offer information that includes the ID code of the vehicle 20.

On the other hand, in step S20 as shown in FIG. 3, the control unit 11 of the vehicle 10 determines whether the offer information is requested. When the control unit 11 has received a signal that indicates the request of the offer information by the V-to-V communication unit 19, the control unit 11 of the vehicle 10 determines that the offer information is requested and advances to step S21. When the signal indicating the request has not been received, the control unit 11 determines that the offer information is not requested and repeats step S20.

Then, in step S21 of FIG. 3, the control unit 11 generates the offer information including the parking space. That is, the control unit 11 generates the offer information that includes the ID code stored in the memory 11*a*, the position information detected by the position detector 13, the activity of the vehicle 10 that it is departing from the parking space and the like.

Then, in step S22 of FIG. 3, the control unit 11 of the vehicle 10 transmits the offer information to the vehicle which has transmitted the signal of the request of the offer information through the communication unit 19. In this case, the vehicle which has transmitted the signal of the request of the offer information is identified by the ID cord included in the transmitted signal.

Returning to FIG. 2, the control unit 21 of the vehicle 20 checks the V-to-V communication unit 29 for a confirmation that the offer information has been received in step S12. Then, in step S13 of FIG. 2, the control unit 21 of the vehicle 20 determines the reception of the offer information based on the processing in step S12, and advances to step S14 when the reception of the offer information is confirmed. When the offer information has not been received, the processing goes back to step S12. In this case, when the signal of the request for the offer information has been sent in step S11, the processing operation of steps S12 and S13 is repeated until the reception of the offer information is confirmed in step S13. However, the control unit 21 of the vehicle may return to step S10 by canceling the processing when the offer information has not been received after a predetermined time from the transmission of the request for the offer information in step S11.

The control unit 21 of the vehicle 20 which has acquired the requested offer information performs a payment process in step S15. That is, the control unit 21 of the vehicle 20 performs the payment process to a management center or the like (not shown in the figure) for transferring a predetermined amount of information fee to an account included in the ID code of the offer information. In this case, a method of this payment process is not specifically defined. That is, any method may be used for the payment process as long as the information fee is transferred to the account.

In this manner, the acquisition of the offer information is made easier because the offer information is provided based on an incentive that the information fee is paid to the offerer of the offer information.

The information communication system in the present embodiment requests the offer information from the vehicle 20, and the vehicle 10 transmits the offer information in response to the request, thereby enabling the acquisition of the offer information on demand (i.e., only when the offer information is required). However, the transmission and the reception of the offer information are not limited in a communication scheme described above. For example, the vehicle in the system may always send and/or receive the offer information.

Further, the information fee may be paid as an equivalent of a point of a commercial point system such as a point system of a department store, a supermarket, a gas station or the like in which the point corresponds to the amount of the information fee paid by the user. In this case, the point may be added to a point card when the control unit 21 performs the process in step S15.

Furthermore, the information fee or the point for the offer information may be set by an offerer of the offer information. That is, the control unit 11 of the vehicle 10 may set the information fee/point for the offer information based on an operation signal when the operation signal of the information fee/point is inputted from the operation device 17. In this manner, the information fee/point that is reasonably defined for the offer of the offer information is set.

Furthermore, the information fee/point may be set in a stepwise manner, that is, a base usage fee/point may be defined as a base portion of an actual usage fee/point that is added on top of the base usage fee/point. The actual usage fee/point may be greater in amount than the base usage fee/point. The base usage fee/point may be defined as a fee/point that is charged for the user of the offer information when the offer information is output to the display unit 25 or to the speaker 26, and the amount of the base usage fee/point is defined to have a substantially constant value. The actual usage fee/point may be defined as a fee/point that is charged for the user of the offer information when the offer information is actually "consumed." For example, when the user of the offer information actually parked a vehicle by utilizing the offer information, the offer information is actually consumed and the user of the offer information is charged for the price of the information. The actual usage fee/point may be higher in comparison to the base usage fee/point. In this manner, the information fee/point for the offer information may be varied depending on the value of the information for the user, thereby being preferably and reasonably charged for the user.

In this case, the control unit 21 may perform the fee/point payment process of the base usage fee/point when the received offer information (parking space information) is output to the display unit 25 or the speaker 26. Then, the control unit 21 may detect the position where a shift gear (not shown in the figure) is shifted to "Parking" by the position detector 23. Then, the control unit 21 may determine whether the vehicle has actually parked based on the detection result of the position of the shift gear and the offer information (parking space information), that is, whether the offer information is utilized by the user or not.

Though the offer information may be described as the parking space information in the above embodiment, the offer information may be different from the parking space information. That is, the offer information may include plural types of information. In addition, the request for the offer information may selectively specify a specific type of information in the offer information. For example, the control unit 21 may display on the screen of the display unit 25 plural pieces of available offer information such as offer information including parking space information, advertisement information of a facility (e.g., a supermarket), traffic information and the like. Then, the control unit 21 may request a transmission of the specific type of offer information based on an operation signal when the operation signal indicative of the specific type offer information is input from the operation device 27. In this manner, only a required portion of the offer information is preferable acquired. In this case, when the traffic information is the information about an accident or the like, the control unit 11 on the transmission side of the offer information may include the current position of the vehicle 10, images of an inside and around the vehicle 10, the current time and the like by using the position detector, a camera (not shown in the figure), a watch.

Figure 4:
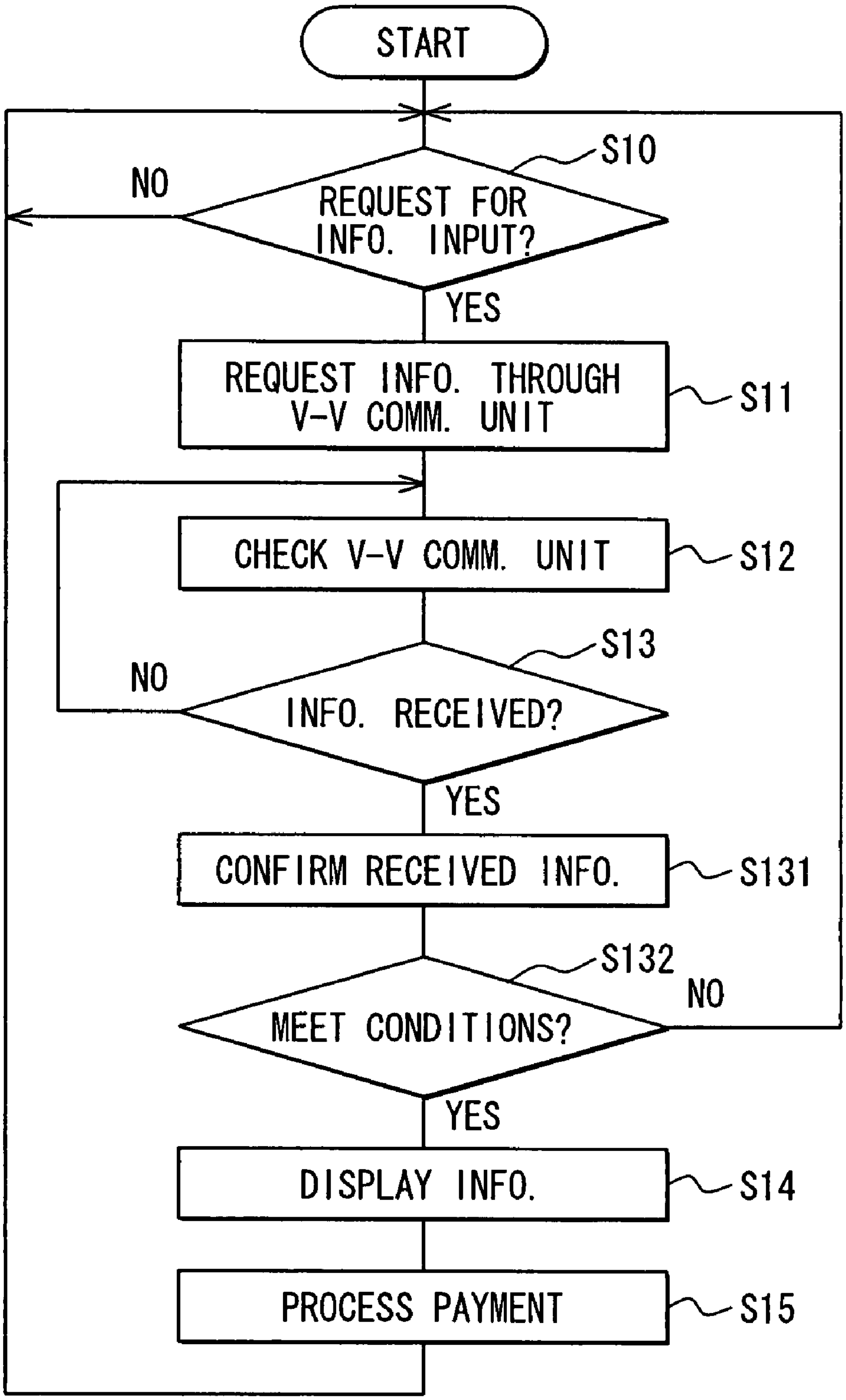
FIG. 4 shows a flowchart of a process on the information acquisition side in a modification of the embodiment of the present disclosure.

An information provision scheme that the information fee/point payment process is configured to be performed (i.e., the user has to pay for the information fee/point) only by receiving the offer information may be put into improper use by a third party having malicious intent. Therefore, a first modification of the information provision scheme for preventing the improper use is described with reference to FIG. 4. FIG. 4 shows a flowchart of the processing operation of the control unit on an information acquisition side of the information communication system in the first modification of an embodiment of the present disclosure.

Because the flowchart in FIG. 4 has a common part with the flowchart in FIG. 2, the following description is focused to the difference between the flowcharts in FIG. 4 and FIG. 2. The different portion of the flowchart in FIG. 4 is steps S131 and S132.

In step S131 in FIG. 4, the control unit 21 of the vehicle 20 confirms the offer information when the offer information is received by the V-to-V communication unit 29.

Then, in step S132 in FIG. 4, the control unit 21 of the vehicle 20 determines whether the offer information confirmed in step S131 fulfills a predetermined condition. When the predetermined condition is fulfilled, the processing operation advances to step S14, and when the condition is not fulfilled, the processing operation returns to step S10.

The predetermined condition in step S132 is a condition that can be set by the user in advance. For example, the predetermined condition may be the amount of the information fee/point, that is, an upper limit of the information fee/point for the received offer information or the like. In this case, The control unit 21 of the vehicle 20 stores upper limit data to the memory 21*a* or the like when the upper limit data is input as the predetermined condition from the operation device 27. Then, the control unit 21 of the vehicle 20 determines whether the information fee included in the received offer information exceeds the upper limit in the upper limit data when the upper limit data is input in step S132. In this manner, the information acquisition side acquires the offer information that is appropriately priced for the information acquisition side. Further, the condition in step S132 may be a destination of the offer information, a content (a type) of the offer information, or the like.

Figure 5:
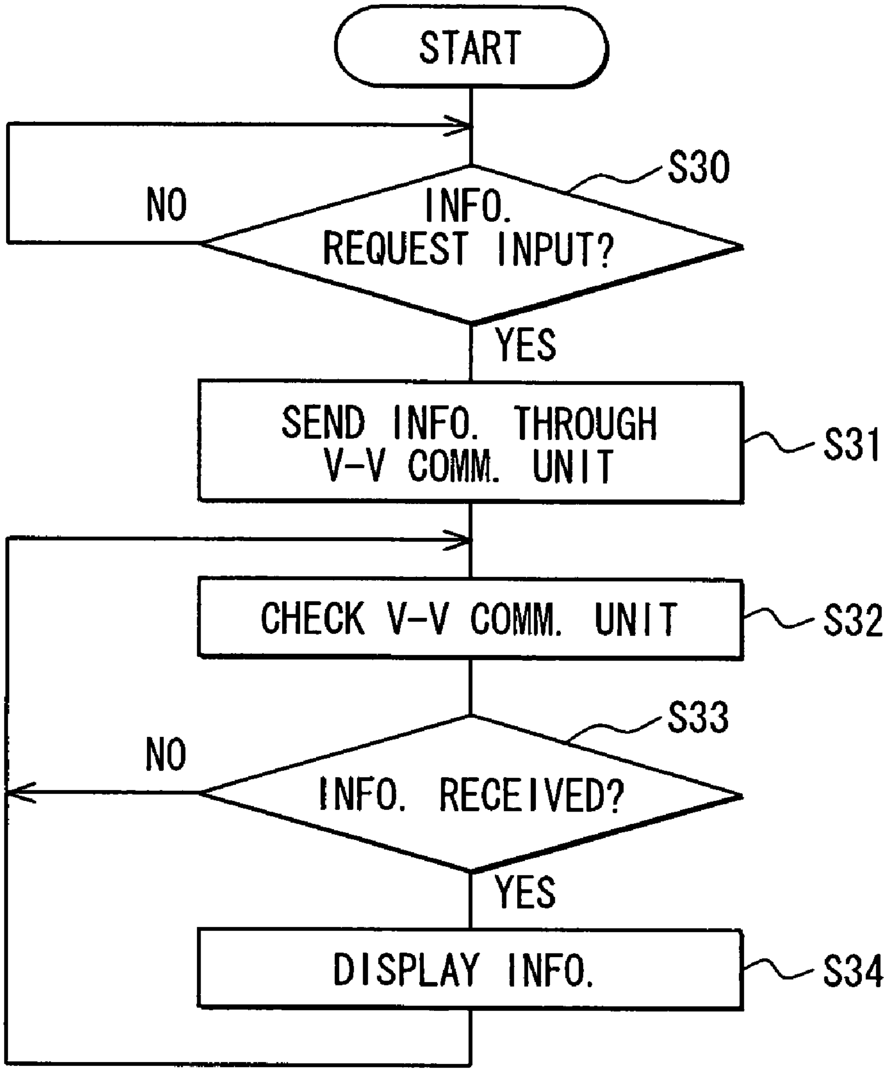
FIG. 5 shows a flowchart of a process on the information acquisition side in another modification of the embodiment of the present disclosure.
Figure 6:
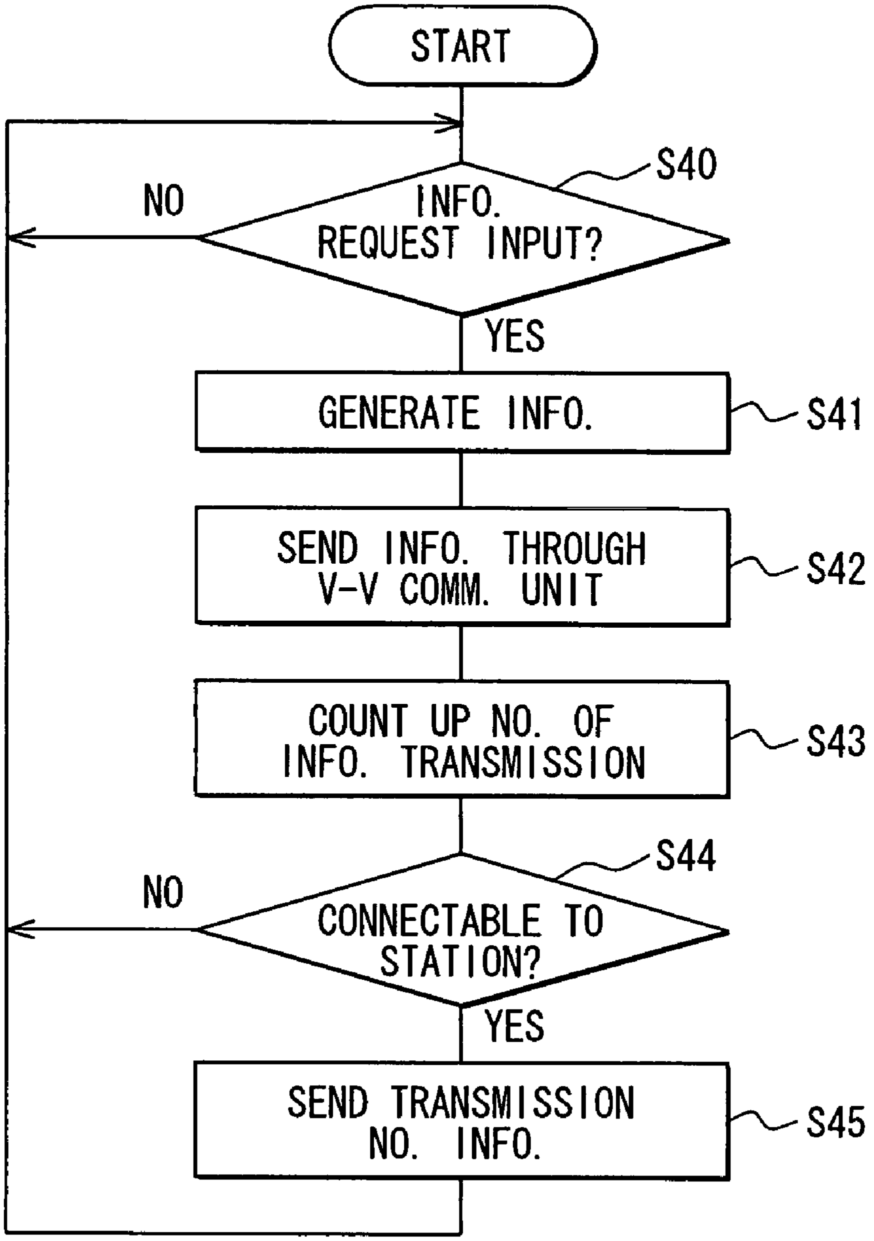
FIG. 6 shows a flowchart of a process on the information transmission side in another modification of the embodiment of the present disclosure.

As a second modification of the embodiment, an information provision scheme that the information acquisition side (the vehicle 20) of the offer information does not pay the information fee/point and an information transmission side (the vehicle 10) receives an advertisement fee/point from a facility when the offer information includes the advertisement information of the facility. FIG. 5 shows a flowchart of the processing operation of the control unit on the information acquisition side in the second modification of the embodiment. FIG. 6 shows a flowchart of the processing operation of the control unit on the information transmission side (i.e., an information requested side) in the second modification of the embodiment. In this case, the flowchart of the processing operations in FIGS. 5 and 6 is performed while the electric power is supplied for the control units 11, 21.

Further, in this case of the second modification, the vehicle 10 receives the advertisement information from a target facility in advance, and stores the advertisement information in the memory 11*a* or the like. Furthermore, the advertisement information may be conveyed to the vehicle 10 by using a memory card that is insertable to the system in the vehicle 10, or may be transmitted to the vehicle 10 while the vehicle 10 is, for example, parking in a nearby parking space or the like.

The process of the information acquisition by the vehicle 20 starts with a determination whether to request the offer information in step S30 by the control unit 21 of the vehicle 20 as shown in FIG. 5. When an operation signal indicative of the request for the offer information is input from the operation device 27, the control unit 21 of the vehicle 20 determines that the offer information is requested and advances to step S31. When the operation signal of the request is not input from the device 27, the control unit 21 repeats step S30.

Then, in step S31, the control unit 21 of the vehicle 20 transmits a signal for requesting the offer information including the ID code of the vehicle 20.

On the other hand, in step S40 in FIG. 6, the control unit 11 of the vehicle 10 determines whether the offer information is requested or not. When a signal of requesting the offer information is received by the V-to-V communication unit 19, the control unit 11 of the vehicle 10 advances to step S41 based on a determination that the offer information is requested. When the signal of requesting the offer information is not received by the V-to-V communication unit 19, the control unit 11 of the vehicle 10 repeats step S40 based on a determination that the offer information is not requested.

Then, in step S41 in FIG. 6, the control unit 11 of the vehicle 10 generates the offer information that includes the advertisement information of the facility. That is, the control unit 11 of the vehicle 10 generates the offer information that includes the ID code stored in the memory 11*a*, the position information of the facility, the advertisement information of the facility including a content of the advertisement and the like.

Then, in step S42 in FIG. 6, the control unit 11 of the vehicle 10 transmits the offer information generated in step S41 to the vehicle which has transmitted a signal indicative of a request for the offer information. In this case, the vehicle that transmitted the signal of the offer information request is identified by the ID code in the signal.

The control unit 11 may be configured to transmit the offer information from the V-to-V communication unit 19 only when the position of the vehicle 10 detected by the position detector 13 is within a predetermined range from the position of the facility. In this manner, the advertisement of the facility is preferably performed within an appropriate range from the facility.

In step S43 in FIG. 6, the control unit 11 of the vehicle 10 stores the number of transmissions of the offer information in the memory 11*a* or the like so as to receive the advertisement fee/point from the facility, and counts up the number of transmissions for each of a new transmission of the offer information.

In step S44 in FIG. 6, the control unit 11 of the vehicle 10 determines whether the facility is connectable through the telephone unit 18 or the like. When the facility is determined to be connectable with the vehicle 10, the process advances to step S45, and when the facility is determined not to be connectable, the process returns to step S40.

In step S45 in FIG. 6, the control unit 11 of the vehicle 10 transmits to the facility the ID code with the number of transmissions of the offer information. That is, the control unit 11 of the vehicle 10 performs the payment process of the advertisement fee from the facility by sending the ID code and the number of transmissions of the offer information. In this manner, the advertisement fee is transferred to the account included in the ID code transmitted by the control unit 11 of the vehicle to facility. In this case, the method of transfer of the fee is not limited to a specific method, and may be conducted in a different manner as long as the advertisement fee is transferred to the predetermined account. In addition, the advertisement fee may be substituted with a point of a point card that is used in the facility, or an information point that corresponds to the information fee. In this case, the control unit 11 performs the process in step S45 for adding the point to the point card.

Returning to FIG. 5, in step S32, the control unit 21 of the vehicle 20 checks the V-to-V communication unit 29 for determining whether the offer information is received in response to the request in step S31. Then, in step S33, the control unit 21 of the vehicle 20 determines the reception of the offer information based on the process in step S32. When the offer information is determined to be received, the process advances to step S34, and when the offer information is determined not to be received, the process returns to step S32. In this case, when the control unit 21 of the vehicle 20 requested the offer information from the V-to-V communication unit 29, that is, when the signal for requesting the offer information is transmitted in step S31, the process repeats steps S32 and S33 until the offer information is determined to be received in step S33. However, when the offer information is not received after a transmission of the signal for requesting the offer information in step S31, the control unit 21 of the vehicle 20 may cancel the process and may return to step S30.

In this manner, the provision of the offer information is facilitated because the provision of the offer information is rewarded by the advertisement fee/point, thereby increasing the availability the offer information. Further, the information acquisition side does not have to pay the information fee/point for the price of the offer information even after acquiring the offer information, thereby being facilitated or enticed to use the offer information.

Such changes and modifications are to be understood as being within the scope of the present invention as defined by the appended claims.

What is claimed is:

1. An inter-vehicular information communication system having plural vehicles that are respectively each equipped with a communication device for establishing direct communication with other of the plural vehicles, the information communication system comprising, in each of the plural vehicles:

an ID code storage that stores an ID code for uniquely identifying that respective one of the plural vehicles;

an information generation unit that generates offer information to be offered to other of the plural vehicles together with the ID code;

an output unit that outputs offer information received by the communication device in a form of at least one of (i) a voice and (ii) an image; and a control unit that (a) controls a transmission of offer information generated by the information generation unit and (b) controls output of offer information received by the communication device from another vehicle, wherein the control unit performs a payment process that pays a user of an offerer vehicle from which the offer information has been transmitted to an acquirer vehicle, for one of (i) an information fee of the received offer information and (ii) an information point that corresponds to the information fee.

2. The information communication system as in claim 1, wherein each of the communication devices further comprises:

an indication unit that indicates one of (i) the information fee of the offer information and (ii) the information point corresponding to the information fee to be offered from the respectively corresponding vehicle, wherein the indication unit is operated by the user, wherein the information generation unit sets for the offer information one of (i) the information fee and (ii) the information point corresponding to the information fee based on a user operation of the indication unit.

3. The information communication system as in claim 1, wherein the control unit outputs the offer information to the output unit and performs the payment process when one of (i) the information fee and (ii) the information point corresponding to the information fee of offer information received by the communication device fulfills a predetermined amount of money or a predetermined number of points.

4. The information communication system as in claim 1, further comprising:

a request unit that requests transmission of offer information from another vehicle, wherein the control unit transmits offer information generated by the information generation unit through the communication device in response to a request from the another vehicle.

5. The information communication system as in claim 4, further comprising:

a selection unit that outputs a selection signal indicating selection of a predetermined kind of offer information among plural kinds of offer information, wherein the selection unit is operated by the user, wherein the request unit requests transmission of the predetermined kind of offer information based on the selection signal.

6. The information communication system as in claim 1, wherein:

the offer information includes parking information that indicates departure of the vehicle that transmits offer information from a parking space and position of the parking space.

7. The information communication system as in claim 6, wherein:

one of (i) the information fee and (ii) the information point corresponding to the information fee includes one of (a) a base usage fee and (b) a base usage point corresponding to the base usage fee as well as one of (c) a real usage fee that is greater in amount than the base usage fee and (d) a real usage point corresponding to the real usage fee, the control unit in the vehicle receiving parking information performs the payment process upon outputting from the output unit parking information received by the communication device, and the control unit in the vehicle receiving parking information performs the payment process upon using the parking space corresponding to parking information received by the communication device.

8. The information communication system as in claim 7, wherein each vehicle further comprises:

a park detection unit that detects parking activity including position of parking for the respectively associated vehicle, wherein the control unit determines whether to perform the payment process based on the park detection unit result and park information received by the communication device.

9. The information communication system as in claim 1, wherein the offer information includes advertisement information of a facility.

10. The information communication system as in claim 9, wherein each vehicle further comprises:

a position detector that detects a current position of the respectively associated vehicle, wherein the advertisement information includes position information of the facility, the control unit transmits the offer information from the communication device only when the current position of the respectively associated vehicle is within a predetermined range from the facility position.

11. The information communication system as in claim 1, wherein the offer information includes traffic information.

12. An inter-vehicular information communication system having plural vehicles that are respectively equipped with a communication device for establishing a direct communication among the plural vehicles, the information communication system comprising, in each of the plural vehicles:

an ID code storage that stores an ID code for uniquely identifying an offerer vehicle from among the plural vehicles;

an information storage unit that stores offer information including advertisement information of a facility to be offered for other of the plural vehicles;

an output unit that outputs the offer information received by the communication device in a form of at least one of (i) a voice and (ii) an image; and a control unit that controls an output of the offer information to the output unit, after transmission of the offer information from the offerer vehicle, through the communication device upon receiving the offer information by the communication device in an acquirer vehicle, wherein the control unit performs, for the facility, a billing process of one of (a) an advertising fee and (b) an advertising point that corresponds to the advertising fee.

13. The information communication system as in claim 12, wherein each vehicle further comprises:

a position detector that detects a current position of the respectively associated vehicle, wherein the advertising information includes position information of the facility, and the control unit transmits the offer information through the communication device only when the current position of the respectively associated vehicle is within a predetermined range from the facility position.

14. A reciprocal reward system including at least an offerer vehicle and an acquirer vehicle that are each respectively equipped with a communication device for direct communication therebetween, the communication device in each of the vehicles comprising:

an ID code storage that stores a vehicle ID for uniquely identifying the respectively associated vehicles;

an information generation unit that generates offer information in the offerer vehicle;

an output unit that outputs offer information aurally or visually in the acquirer vehicle; and a control unit that controls (a) transmission of the offer information from the offerer vehicle to the acquirer vehicle through the communication device, and (b) payment for the offer information in response to the transmission of the offer information, wherein:

payment from the acquirer vehicle to the offerer vehicle is performed in a transaction using one of (i) publicly-circulated money and (ii) privately-circulated payment points, and payment from the acquirer vehicle to the offerer vehicle is performed when offer information fulfilling an acquiring vehicle user's preference is output in the acquirer vehicle.

15. The reciprocal reward system of claim 14, wherein:

offer information of a vehicle user's preference includes a parking space in a parking facility, and payment from the acquirer vehicle to the offerer vehicle is performed when a demand for the parking space from the acquirer vehicle and an offer of the parking space from the offerer vehicle are matched.

16. The reciprocal reward system of claim 14, wherein:

offer information of a vehicle user's preference identifies content of the offer information that is selectively specifiable, and payment from the acquirer vehicle to the offerer vehicle is performed when the content of the offer information matches a request from the acquirer vehicle.

17. The reciprocal reward system of claim 14, wherein:

offer information of a vehicle user's preference includes an upper limit of payment, and payment from the acquirer vehicle to the offerer vehicle is performed when the upper limit of payment is under a threshold value.

* * * * *